United States Patent [19]

Oman et al.

[11] Patent Number: 5,406,713
[45] Date of Patent: * Apr. 18, 1995

[54] APPARATUS FOR MAINTAINING A SCIENTIFIC AND MEASURING INSTRUMENT OR THE LIKE IN A LEVEL PLANE

[76] Inventors: Robert Oman, 284 Maplehurst Avenue, Toronto, Ontario, Canada, M2N 3C4; David Oman, 330 Winnifred Drive, Keswick, Ontario, Canada, L3P 3B5

[*] Notice: The portion of the term of this patent subsequent to Aug. 21, 2007 has been disclaimed.

[21] Appl. No.: 826,513

[22] Filed: Jan. 27, 1992

Related U.S. Application Data

[63] Continuation of Ser. No. 566,217, Aug. 13, 1990, abandoned, which is a continuation-in-part of Ser. No. 252,758, Oct. 3, 1988, Pat. No. 4,949,467.

[51] Int. Cl.⁶ .......................... G01C 9/06; G01C 9/12
[52] U.S. Cl. .......................................... 33/366; 33/392; 33/397; 33/299; 33/291; 248/188.3; 248/550
[58] Field of Search ................ 33/366, 391, 392, 397, 33/333, 354, 291, 299; 248/550, 188.3

[56] References Cited

U.S. PATENT DOCUMENTS

| | | | |
|---|---|---|---|
| 3,185,423 | 5/1965 | Jones, III | 248/188.3 |
| 3,578,278 | 5/1971 | Pickering et al. | 248/550 |
| 3,850,395 | 11/1974 | O'Connor | 248/188.3 |
| 3,935,643 | 2/1976 | Russell et al. | 33/366 |
| 3,962,693 | 6/1976 | Schamblin | 340/261 |
| 3,975,831 | 8/1976 | Jysky et al. | 33/366 |
| 4,370,813 | 2/1983 | Burniski | 33/366 |
| 4,507,603 | 3/1985 | Roach et al. | 33/366 |
| 4,628,556 | 12/1986 | Blackman | 248/550 |
| 4,662,809 | 5/1987 | Sturtz et al. | 33/366 |
| 4,669,696 | 6/1987 | Petta | 248/550 |
| 4,887,359 | 12/1989 | Hofius | 33/366 |
| 4,943,158 | 7/1990 | Pertl et al. | 33/366 |
| 4,949,467 | 8/1990 | Oman et al. | 33/366 |

FOREIGN PATENT DOCUMENTS

| | | | |
|---|---|---|---|
| 0005583 | 11/1979 | European Pat. Off. | 248/550 |

Primary Examiner—Diego F. F. Gutierrez

[57] ABSTRACT

An apparatus for maintaining a scientific or measuring instrument or the like in a level horizontal plane. The apparatus comprises an inclinometer comprising a support housing and a plumb member freely suspended within the support housing. The plumb member has an exterior surface provided with first sensing means and the support housing has an interior surface provided with second sensing means cooperative with the first sensing means in determining simply variation of the support housing from an exact upright position. Automatic adjustment means are also provided which are responsive to the first and second sensing means for adjusting the support housing to maintain an upright positioning of the support housing and the instrument attached thereto.

5 Claims, 4 Drawing Sheets

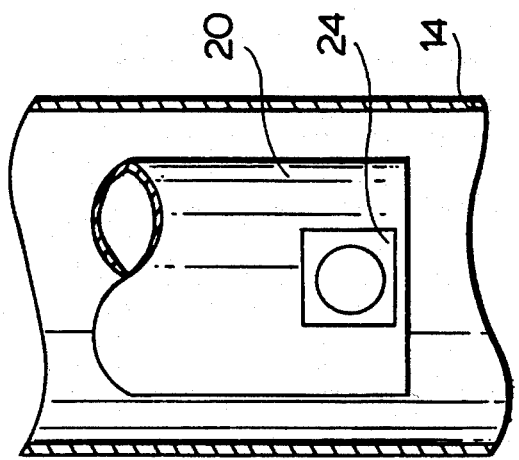
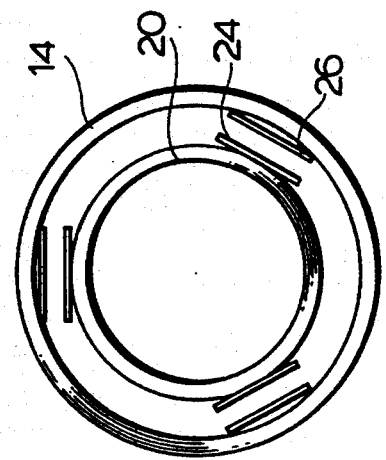
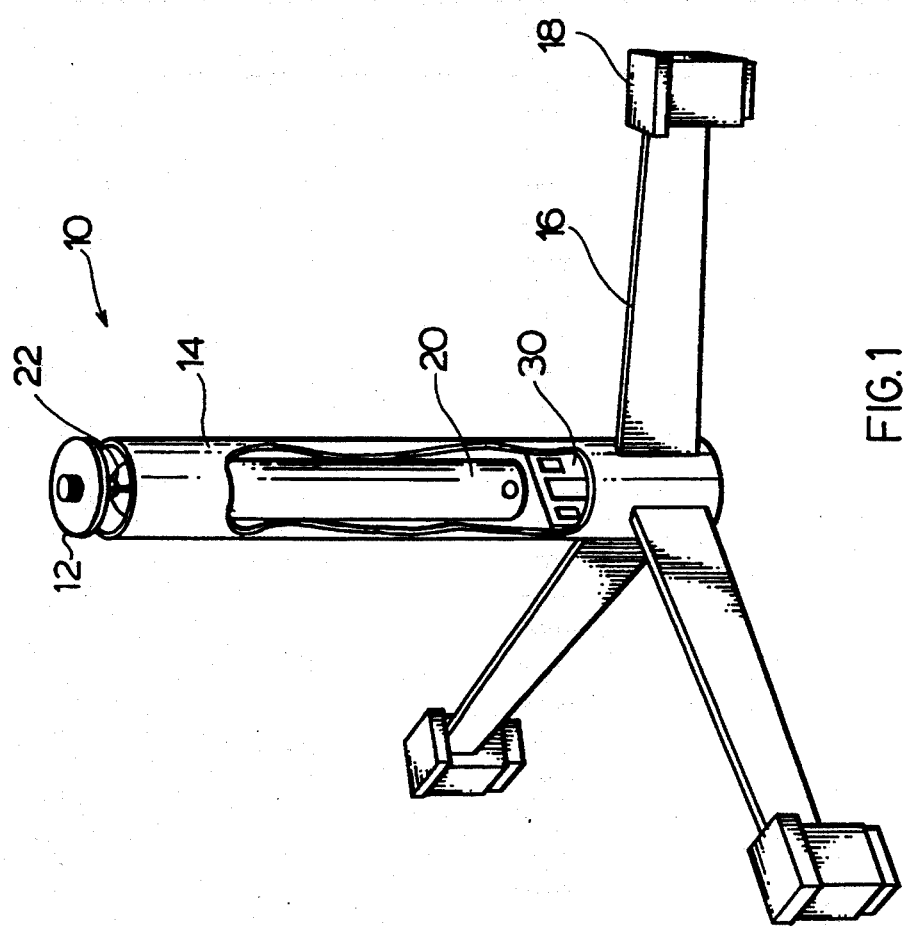

APPARATUS FOR MAINTAINING A SCIENTIFIC AND MEASURING INSTRUMENT OR THE LIKE IN A LEVEL PLANE

This is a Continuation application of application Ser. No. 07/566,217, filed on Aug. 13, 1990, now abandoned, which is a continuation-in-part application of U.S. Ser. No. 07/252,758, filed Oct. 3, 1988, now U.S. Pat. No. 4,949,467.

FIELD OF THE INVENTION

The present invention is directed to an apparatus for maintaining a scientific or measuring instrument or the like on a level plane.

BACKGROUND OF THE INVENTION

There have been many types of different inclinometers available in the past. However, those that have been capable of providing accurate sensing of the upright positioning of a body have been relatively complicated and further are limited in the type of sensing devices required to make them operate. For example, U.S. Pat. No. 3,935,643 issued Feb. 13, 1976 describes a measuring device usable as an inclinometer and operated by means of magnetic sensors. The setup in this patented structure requires four-solenoids divided into two differential fluxgate pairs in balanced positions beneath a magnet supported in a pendulum like manner.

As a result of the above and below positioning of the magnet relative to the fluxgates, all four of the solenoids are required for proper measurements. Furthermore, the fluxgates themselves will not only be expensive but are extremely finicky and subject to damage and heat fluctuations requiring very delicate handling of the apparatus in this particular patent.

Other inclinometer type devices have been developed using plumb members such as the arrangement described in U.S. Pat. No. 3,962,693 issued Jun. 8, 1976 to Schamblin. The drawback in this structure is that it requires an actual touching of the plumb member to its surounding sensors to indicate an out of plumb position. Therefore, the device of this patent is not capable of determining slight inaccuracies in upright positioning of apparatus requiring such positioning.

There have, additionally, been designed many different types of apparatus for supporting scientific or measuring instruments. Tripods have been found to be particularly useful as under most conditions they provide an extremely stable platform for measuring or recording relatively slow moving events. However, when such instruments are used on unstable ground, as for example, on sandy soil or the like, the weight of the instrument on the tripod causes an uneven sinking of the tripod legs into the sand resulting in on off-level positioning of the instrument. This is a major drawback where, for example, in amateur telescopy the astronomer wishes to take a picture of the stars over a long time exposure requiring an extremely stable level support.

SUMMARY OF THE INVENTION

The present invention provides an apparatus for maintaining a scientific and measuring instrument or the like on a level plane. The apparatus comprising an inclinometer comprising a supporting housing and a plumb member suspended within the supporting housing. The plumb member is provided on its exterior surface with first sensing means while the supporting housing is provided on its interior surface with second sensing means cooperative with the first sensing means for determining exact upright positioning of the supporting housing. The supporting housing includes an instrument stand adaptor and adjustment means responsive to the first and second sensing means of the inclinometer for adjusting upright positioning of the inclinometer and accurate leveling of the instrument on the stand adaptor.

BRIEF DESCRIPTION OF THE DRAWINGS

In drawings which illustrate a preferred embodiment of the invention in which

FIG. 1 is a perspective view partly in section showing the preferred embodiment of the instrument stand;

FIG. 2 is a side sectional view of the end of the pendulum in the interior of the hollow tube showing the details of the emitters of the preferred embodiment;

FIG. 3 is a top sectional view taken through the end of the pendulum in the hollow tube showing the opposed emitter sensor pairs;

DETAILED DESCRIPTION OF THE PREFERRED EMBODIMENTS

Figure 4:
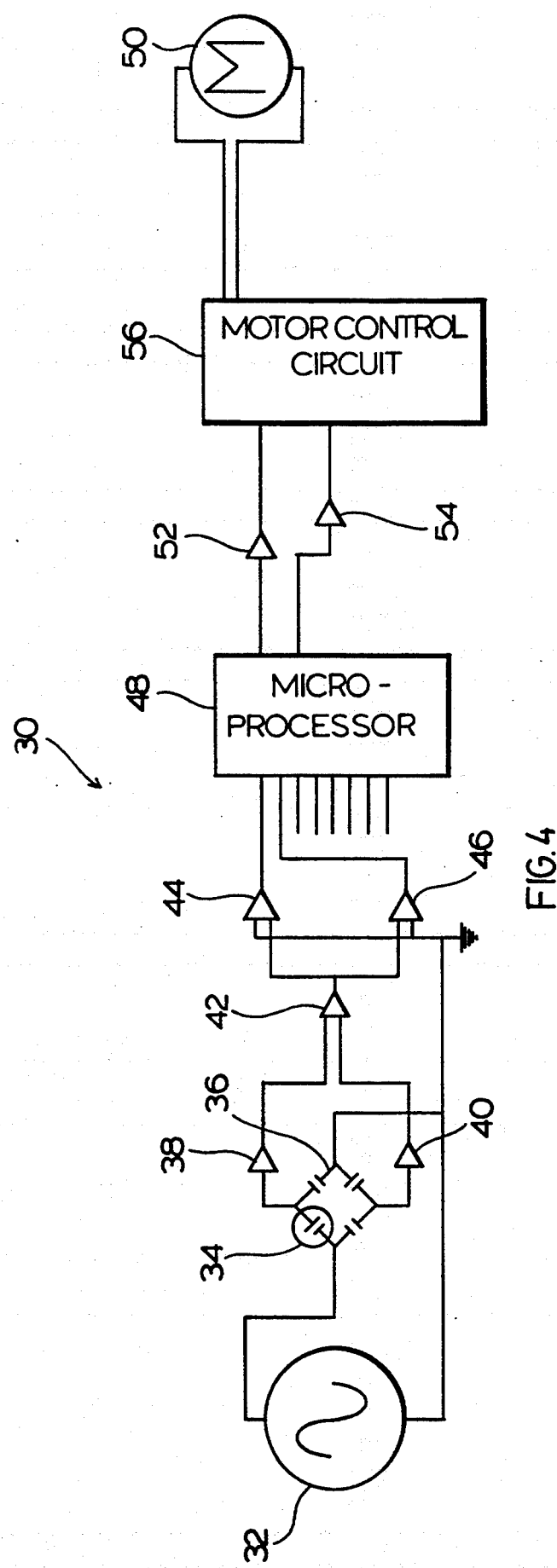
FIG. 4 is a block diagram of the control circuit for the preferred embodiment.

Referring now to FIG. 1, an apparatus for maintaining a scientific or measuring instrument or the like on a level plane incorporating an inclinometer of one preferred embodiment is indicated generally at 10. This apparatus comprises an instrument stand adaptor 12 designed to be able to hold a variety of scientific and measuring instruments (not shown). Extending below the instrument stand adaptor is a supporting housing 14. Attached to the bottom of the housing 14 are three legs 16 spaced equidistantly about the housing (i.e. at 120° angles from each other). At the end of the legs 16 are adjustable feet 18, details of which will be explained further herebelow.

Suspended within the housing 14 is a preferred embodiment inclinometer comprising a plumb member 20 which is attached to the instrument stand adaptor through a non-rotatable pivot attachment 22 such as a universal joint. The plumb member is free to swing about this pivot attachment, but is restrained from rotational movement. It is preferable to also dampen the motion of the plumb member to prevent oscillation of the plumb member. This can be accomplished by any of the means which would be well known in the art. At the bottom of the housing 14 below the plumb member 20 is a circuit board 30 containing the control circuit.

With reference to FIG. 2, the details of a preferred embodiment of the sensing means are shown. The first sensing means 24, on the bottom of the plumb member 20, is a metal plate which makes up one half of an air gap capacitor, the other half being comprised of the second sensing means 26 on the interior of the housing 14 as shown in FIG. 3. FIG. 3 illustrates the relationship between the two metal plates comprising the first sensing means 24 and the second sensing means 26 making up a capacitor with air as the dielectric. It is possible to use other sensing means such as coupled inductors for sensing means, in which case the first sensing means would be a permanent or electromagnet capable of inducing a current in the second sensing means when the housing is moved from an exact upright position.

FIG. 4 shows a control circuit for the self adjusting feature of the instrument stand adaptor. A sine wave generator 32 applies a signal to the plumb member mounted metal plate 24 which together with the metal plate 26 on the housing 14 comprise an airgap capacitor 34. The signal is capacitively coupled to the metal plate 26 which forms the variable leg of one of three capacitive bridge circuits 36. Only one of these circuits 36 is illustrated in FIG. 4. The output of the opposite arms of this capacitive bridge is amplified separately by amplifiers 38 and 40. Each pair of signals from 38 and 40 is then applied to the input of a comparator or differential amplifier 42. As long as the imputs to the differential amplifier 42 are equal, the output of the amplifier is a 0 voltage.

If the capacitance in the capacitor bridge 36 changes due to a variation in the distance between the metal plates 24 and 26 making up the air gap capacitor, the inputs to the differential amplifier 42 will be unequal and the output of this amplifier will go to a positive or negative value depending on whether the capacitance has increased or decreased. This output will turn on one of a pair of operational amplifiers 44 and 46 depending upon whether the voltage is positive or negative. These amplifiers are connected to the input bus data lines of a microprocessor chip 48.

When the housing 14 is in a vertical position and the instrument stand adaptor is on a level horizontal plane, the output from the two arms of the three capacitor bridges will all be equal and the output of each of the differential amplifiers 42 will be 0 and all of the six input bus data lines of the microprocessor chip 48 will be at logic 0 level. If any of the input bus data lines of the microprocessor chip 48 is turned on by its respective operational amplifier 44 or 46, the microprocessor, through a software program, will detect which of the air gap capacitors 34 has changed value and which way it has changed, either increasing or decreasing in capacitance. The microprocessor 48, will then send a pulse through operational amplifier 52 telling one of the stepper motors 50 to step. The amount of the stepping up or down of the stepper motor 50 will be controlled by pulses sent through operational amplifier 54 to the control circuit 56 for the stepper motor 50. These pulses will continue to be sent until the capacitor bridge 36 is balanced and hence the input of the bus data line of the microprocessor chip 48 returns to a logic 0 state. In this way, if the unit were standing on soft ground that slowly settled or if a sudden load were applied, such as by mounting a telescope or other instrument on the platform, the control circuit will maintain or establish a vertical position of the support post.

Figure 5:
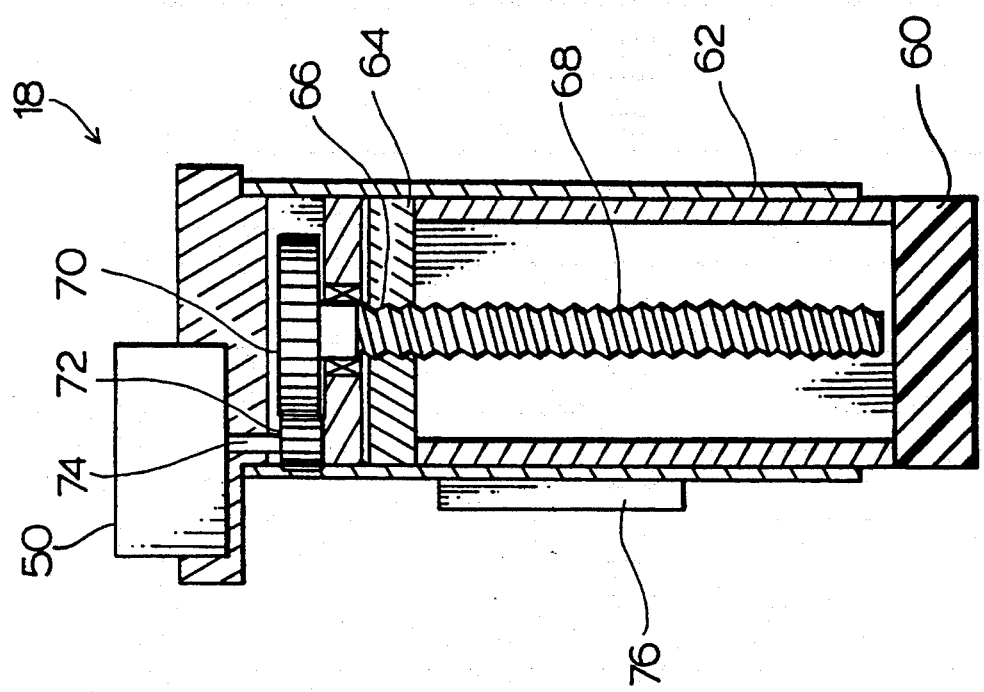
FIG. 5 is a side sectional view of the adjustable feet.

FIG. 5 shows the details of the construction of the adjustable foot 18. The foot comprises a ground contact area 60 which is preferably constructed of a material such as rubber so that if the apparatus is used on a finished surface, it will not damage such surface. The ground contact area is attached to the bottom of a hollow cylinder 62 with the opposite end of the cylinder having a threaded opening 66 therein. Threaded through this opening 66 is a threaded adjusting screw 68. At the top of the adjusting screw 68 is a first gear 70 which is engaged to a second gear 72 mounted on the shaft 74 of the stepper motor 50. The adjusting foot is mounted to leg 16 through mounting means 76.

As explained above, when a signal is sent to the stepping motor 50 the motor is activated and depending on the number of pulses sent to the motor by the microprocessor 48, the motor steps 1 step for every pulse. The action of the motor drives first gear 72 through shaft 74 which in turn causes the rotation of second gear 70 and its attached threaded adjusting screw 68. This rotation of the threaded adjusting screw 68 causes the hollow cylinder 62 to ride up and down on the threaded adjusting screw 68. In this way the height of the ground contact area 60 from the arm attachment means 76 and consequently from the arm of the apparatus is varied until the apparatus is returned to the level horizontal plane.

A battery of rechargable cells (not shown) is mounted in the lowest portion of the housing 14 to supply power for the control circuit and the the stepper motors.

For ease in storage and transportation, the apparatus 10 is designed such that the legs 16 can be easily removed from the housing 14. This may be accomplished, for example, by providing complementary locking mechanisms on the housing 14 and leg 16, preferably over center cam locks (not shown). To setup the apparatus, the legs 16 are snapped and locked in place by three overcenter cam locks. The power source from the housing 14 can be connected to the motors 50 through two contacts in each leg 16 mating with a pair of contacts in the housing in each position where the legs snap on. Once assembled, the unit is placed in position and turned on. It will quickly adjust the mounting feet until the housing is vertical.

Figure 6:
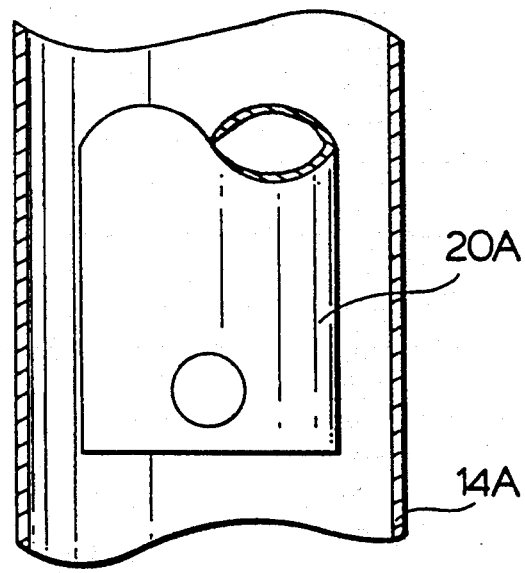
FIG. 6 is a side sectional view of a second embodiment of the end of the pendulum in the interior of the hollow tube.
Figure 7:
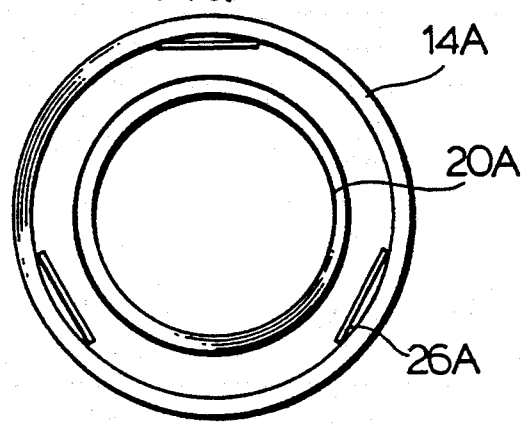
FIG. 7 is a top sectional view of the embodiment of FIG. 6 taken through the end of the pendulum in the hollow tube.

A second embodiment of the plumb member of the present invention is shown in FIGS. 6 and 7. In this embodiment the separate plates 24 are not provided but rather the plumb member 20A fulfills the role of the first sensing means for the air gap capacitors. In all other aspects the remainder of the apparatus is identical to that of the first embodiment.

The apparatus of the present invention is useful for supporting measuring and scientific instruments. The apparatus is particularly useful to support small and medium sized portable astonomical telescopes both reflecting and refracting types. The apparatus can also be used for mounting portable laser and optical alignment equipment used in the field for surveying and geodetic exploration, for mining and minerals prospecting or anywhere that portable and quick assembly together with ease of alignment and stability are desirable. The apparatus is also useful on construction sites for alignment of structures or striking of lines for suspended ceilings in large office buildings using a laser mounted vertically on the platform with a rotating prism above it to deflect the beam horizontally.

In addition, the inclinometer which comprises the housing, plumb member, first and second sensing means, control circuit and power source can also be used in typical applications utilizing such an apparatus. One example of such a use is in drilling of oil wells where it is necessary to have a vertical drill hole. In such applications small variations from a true vertical can cause damage to the drill rods and other components. When the inclinometer is used in such applications, the output of the microprocessor which indicates the degree of tilt of the housing from the vertical, rather than being used to drive stepper motors, may be displayed and recorded to thereby indicate the degree by which the bore hole moves from a true vertical. Additionally, the inclinometer may be incorporated into the drill apparatus such that the output of the microprocessor may be utilized to correct for variation of the drill from vertical during operation. In such applications, owing to the excess movement to which the apparatus will be subjected as it is utilized in the bore hole, it is preferred to increase the dampening of the motion of the plumb member. This may be accomplished by filling the housing with a viscous liquid which in addition to dampening the motion of the plumb member, is also an acceptable dielectric for the capacitor of the coupled sensing means. The selection of such a material would be understood by those of ordinary skill in the art.

Although various preferred embodiments of the present invention have been described herein in detail, it will be appreciated by those skilled in the art that variations may be made thereto without departing from the spirit of the invention or the scope of the appended claims.

The embodiments of the invention in which an exclusive property or privilege is claimed are defined as follows:

1. An apparatus for maintaining a scientific or measuring instrument in a level horizontal plane comprising an inclinometer comprising a support housing and a plumb member freely suspended within said support housing, said support housing comprising an elongated hollow tube, said plumb member comprising an elongated body suspended within said elongated hollow tube, said elongated body being supported in a manner to prevent rotation thereof along its longitudinal axis and having an exterior surface provided with first sensing means and said support housing having an interior surface provided with second sensing means cooperative with said first sensing means, said first and second sensing means forming sensing means pairs to determine the degree of variation of said support housing from an exact upright position, said sensing means pairs being in an electrically balanced condition when said support housing is in an exact upright position, and automatic adjustment means responsive to said sensing means pairs, said automatic adjustment means including a control circuit comprising means for determining an electrically unbalanced condition of said sensing means pairs and adjusting the support housing to return to the electrically balanced condition of the sensing means pairs and thereby maintain an upright position of said support housing.

2. An apparatus for maintaining a scientific or measuring instrument in a level horizontal plane comprising;

an instrument stand adaptor supporting said instrument; a hollow tube extending vertically therebelow;

three equidistantly spaced legs projecting generally horizontally from the lower end of said hollow tube, each of said legs at its outer end having an adjustable foot for contacting a supporting surface;

a plumb member suspended vertically from a pivot mount within said hollow tube of said instrument stand adaptor and able to freely move about said pivot mount, said plumb member having provided on its lower end first sensing means, the interior surface of said hollow tube having mounted thereon second sensing means opposing said first sensing means and forming sensing means pairs;

a control circuit interconnecting said sensing means pairs and said adjustable feet;

wherein when said instrument stand adaptor is in a level horizontal plane said sensing means pairs are in an electrically balanced condition and when said instrument stand adaptor deviates from said level horizontal plane said control circuit detects an electrically unbalanced condition of said sensing means pairs and adjusts said feet until said sensing means pairs are returned to said electrically balanced condition whereby said instrument stand adaptor is returned to the level horizontal plane.

3. An apparatus as claimed in claim 2 wherein said first sensing means comprise three equidistantly spaced sensing means.

4. An apparatus for maintaining a scientific or measuring instrument in a level horizontal plane comprising an inclinometer comprising a support housing and a plumb member freely suspended within said support housing in a manner to prevent rotation thereof along its longitudinal axis, said plumb member having an exterior surface provided with first sensing means and said support housing having an interior surface provided with second sensing means cooperative with said first sensing means, said first and second sensing means forming sensing means pairs to determine the degree of variation of said support housing from an exact upright position, said first and second sensing means comprising a plurality of individual sensing elements respectively opposing one another, said sensing means pairs being in an electrically balanced condition when said support housing is in an exact upright position, and automatic adjustment means responsive to said sensing means pairs, said automatic adjustment means including a control circuit comprising means for determining an electrically unbalanced condition of said sensing means pairs and adjusting the support housing to return to the electrically balanced condition of the sensing means pairs and thereby maintain the upright position of said support housing.

5. An apparatus as claimed in claim 4 wherein said plurality of opposing sensing elements form three sensing mean pairs spaced equidistantly from one another.

* * * * *